Aug. 2, 1927.

R. C. HILTON 1,637,642

FRICTION HINGE

Filed March 10, 1926

Inventor
Roland C. Hilton
By Hazard and Miller
Attorneys

Patented Aug. 2, 1927.

1,637,642

UNITED STATES PATENT OFFICE.

ROLAND C. HILTON, OF HOLLYWOOD, CALIFORNIA, ASSIGNOR, BY DIRECT AND MESNE ASSIGNMENTS, TO JOSEPH BERMAN, OF LOS ANGELES, CALIFORNIA.

FRICTION HINGE.

Application filed March 10, 1926. Serial No. 93,591.

My invention is a friction hinge adapted for use on doors, windows or the like, to retain such doors, windows, etc., in adjusted position and to allow full action as a hinge when desired.

An object of my invention is a friction hinge which will allow a door, window or the like to remain in any adjusted position due to the friction of the different elements of the hinge one on the other.

A more particular object of my invention is to make a hinge which allows one part to be squeezed slightly together and therefor develop a clamping friction between the squeezable part of the hinge and another rigid element. Thus a feature of my invention is in allowing a slight squeezing together of one of the hinge elements in the direction of the pintle, thus securely clamping one of the hinge elements to the other.

A further object of my invention is in a hinge structure to utilize washers or the like of suitable wearing material surrounding the pintle between adjacent parts of the hinge and one of the parts of the hinge being adapted to be squeezed to thereby increase the friction resistance at the washer so that the hinge will remain in any desired position.

In constructing my friction hinge I form one of the hinge elements with a solid hub through which the pintle may extend; the hub being rigidly secured to the hinge lead. The other hinge member is provided with a plurality of hubs of ear type to fit on the ends of the rigid hub. The leaf to which the ear hubs are connected is formed with a slit or the like so that the leaf may be slightly squeezed together, thereby pressing the ears tightly against the solid hub. This squeezing action is done by the pintle which extends through the ear hubs and the solid hubs, the pintle having screw threads to allow tightening and thereby clamping the leaf elements of the hinge in adjusted position.

Another feature of my invention is in incorporating wearing washers between the rigid hub and the ear hubs so that the wear resistance of friction is on the washers. This allows hinges to be made of material which is not adapted to frictional wear and to have washers inserted of friction material.

My invention will be more readily understood from the following description and drawings, in which.

Figure 1:
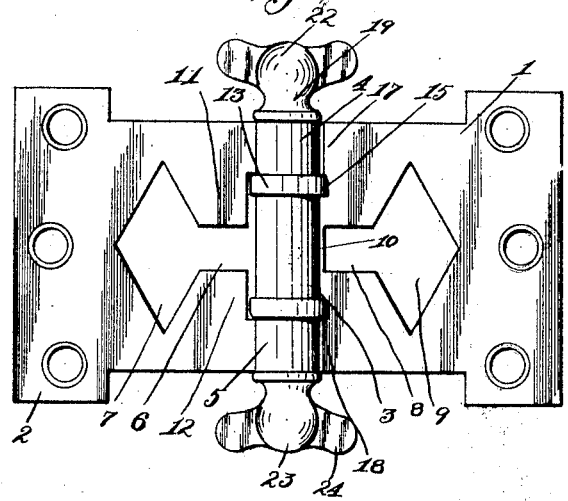
Fig. 1 is a side elevation of a friction hinge made in accordance with my invention.

The hinge is formed of a pair of leaves 1 and 2, the leaf 1 having a central hub 3 rigidly secured thereto; the leaf 2 having ear hubs 4 and 5 to register in alinement with the hub 3. The body portion of the leaf 2 is formed with a slot 6 and if desired with an enlarged cut-out portion 7, this latter giving greater resiliency as hereunder set forth.

The leaf 1 is usually formed with a slot 8 and with a cut-out section 9 similar to the slot and cut-out sections 6 and 7; these being more or less ornamental and to balance the hinge in design. It will be noted that the leaf 1 has a substantial strip of metal 10 adjacent the hub. However, the hub forms a sufficient connection between the two sections of the leaf. The leaf 3 has an upper section 11 and a lower section 12 which are disconnected.

Figure 3:
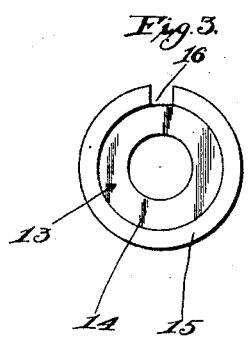
Fig. 3 is a detail plan of one of the friction washers.

A pair of washers 13 are fitted between the rigid hub 3 and the ear hubs 4 and 5. These washers are shown more in detail in Fig. 3 and comprise a flat annulus 14 with a rim 15; the rim having a cut-out segment 16; such segment being adapted to fit on each side of the upper and lower parts 17 and 18 of the leaf 1.

The pintle 19 preferably has a straight shank 20 with a screw threaded end 21; the head 22 of the pintle being of any suitable design and having a nut 23 with finger grips 24 and a screw driver kerf 24' or the like to allow tightening. The head 22 and the nut 23 are preferably of similar design.

Figure 2:
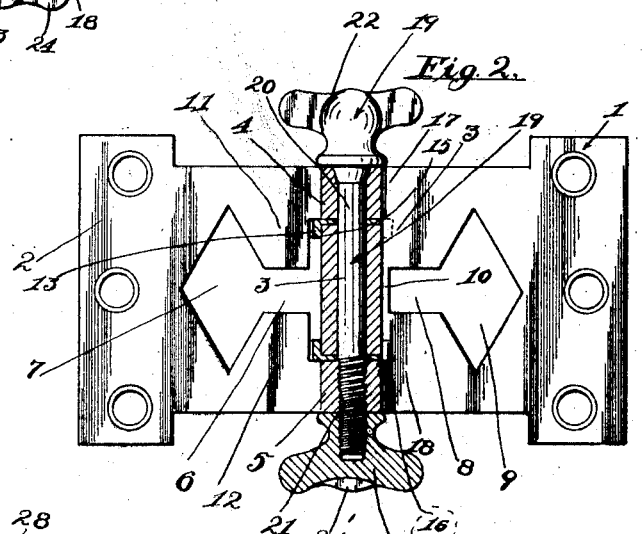
Fig. 2 is an elevation similar to Fig. 1 showing a longitudinal section through the hubs of the hinge leaves.

In the construction of the hinge of Figs. 1 and 2, the leaves 1 and 2 and their respective hubs would preferably be made of steel, iron or other material which may not form a good friction or wearing surface. Therefore the washers 13 may be made of bronze, brass or other good friction material to give a resistance to the action of the hinge.

The manner of use of the hinge is substantially as follows:

It will be understood that the hinge will be secured to doors, windows or the like in the ordinary manner and by having the nut 23 loose on the pintle the article hinged may swing freely. However, on tightening the nut 23 the leaf 2 is slightly squeezed together on account of the slot 6 and the cut-out section 7 allowing the ears 4 and 5 to squeeze slightly towards each other; therefore bringing in a compression resistance on the washers 13. It will be manifest that sufficient resistence may be developed by tightening the pintle to hold heavy doors and windows in adjusted position.

Figure 4:
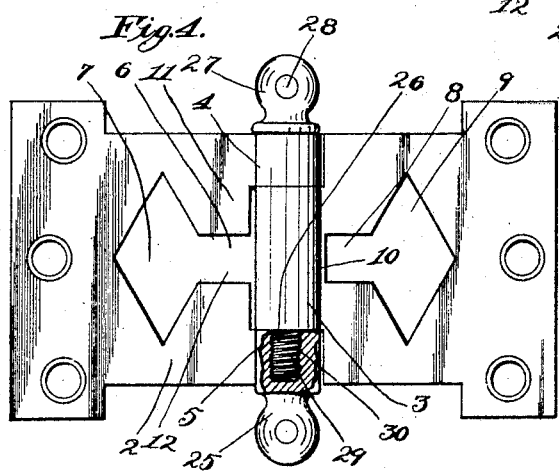
Fig. 4 is a modification of my hinge eliminating the friction washers.

In the construction of Fig. 4, the washers 13 are omitted and the leaf 2 is shown with an integral ornamental extension 25 on the ear hub 5. The pintle 26 has a head 27 with a hole 28 extending therethrough to allow turning of the pintle with a nail or the like as a lever. The opposite end 29 of the pintle is threaded and engages threads 30 in the hub 5. The action of this hinge is substantially the same as that of Figs. 1 and 2. When the pintle is turned by the head 27 as it is screwed tightly in the hinge 5, it draws this hub and the hub 4 in close contact with the similar hub 3 and thereby develops a friction resistance between the hubs; therefore restraining the movement of the leaves of the hinge, holding the hinged article in the desired position. This type of hinge is useful for constructions in which the material of the hinge is good friction material such as brass or bronze hinges or the like.

It will be noted that in my friction hinge the web of the hinge leaves, the portion of the leaves having the apertures for securing same to the door and door jamb and the hub, are substantially in one plane. The slot 6 and the cut-out part 7 weaken the web, allowing the hubs 4 and 5 to be squeezed inwardly against the hub 3 of the rigid part of the hinge.

Although I have shown my hinge as of only one type, it is manifest that it may be changed materially in design to suit various types of articles to be hinged and therefore may be altered in general construction and in specific details. Such changes would be within the spirit of my invention as set forth in the description, drawings and claims.

Having described my invention, what I claim is:

1. A friction hinge comprising in combination a pair of hinge leaf elements, each leaf having a web portion, a part to be connected to a door or a door jamb and a hub portion, said various portions being substantially in one plane, one of the leaf elements having a slot in the web with hubs spaced apart on opposite sides of the slot, the other hub element being rigid and having a central hub, washers, each having a flat annular portion and a rim, the rim having a cut-out section, said washers being fitted between the connecting hubs with the cut-out portion of the rim engaging the rigid leaf element, a pintle extending through the hubs and the washers, and a nut threaded on the pintle allowing pressing of the outer hubs and the washers against the inner hub, the leaf element having the slot being resilient.

2. A friction hinge comprising in combination a pair of hinge leaf elements, each leaf having a web portion, a part to be connected to a door or a door jamb and a hub portion, said various portions being substantially in one plane, one of the leaf elements having a slot in the web with hubs spaced apart on opposite sides of the slot, the other hub element being rigid and having a central hub, a pintle extending through the hubs, and a nut threaded on the pintle allowing pressing of the outer hubs against the inner hub, the leaf element having the slot being resilient.

In testimony whereof I have signed my name to this specification.

ROLAND C. HILTON.